Jan. 17, 1950  M. N. YARDENY  2,494,922
APPARATUS FOR SELECTIVELY POSITIONING A LOAD
Filed Nov. 23, 1943  4 Sheets-Sheet 1

MICHEL N. YARDENY
INVENTOR

BY John P. Nikonow
ATTORNEY

Jan. 17, 1950 M. N. YARDENY 2,494,922
APPARATUS FOR SELECTIVELY POSITIONING A LOAD
Filed Nov. 23, 1943 4 Sheets-Sheet 2

MICHEL N. YARDENY
INVENTOR

ATTORNEY

Jan. 17, 1950    M. N. YARDENY    2,494,922
APPARATUS FOR SELECTIVELY POSITIONING A LOAD
Filed Nov. 23, 1943    4 Sheets-Sheet 3

Michel N. Yardeny
INVENTOR

BY John P. Nikonow
ATTORNEY

Jan. 17, 1950    M. N. YARDENY    2,494,922
APPARATUS FOR SELECTIVELY POSITIONING A LOAD
Filed Nov. 23, 1943    4 Sheets-Sheet 4

MICHEL N. YARDENY
INVENTOR

BY John P. Nilsonow
ATTORNEY

Patented Jan. 17, 1950

2,494,922

UNITED STATES PATENT OFFICE 2,494,922

APPARATUS FOR SELECTIVELY POSITIONING A LOAD

Michel N. Yardeny, New York, N. Y.

Application November 23, 1943, Serial No. 511,457

15 Claims. (Cl. 318—33)

1

My invention relates to control apparatus and has particular reference to apparatus in which a movable useful load or object is placed in a desired selected predetermined position.

This is continuation in part of my applications, Serial No. 388,775, filed April 16, 1941, and Serial No. 502,056, filed September 11, 1943, both abandoned.

My invention has for its object to provide a control system by means of which a load can be placed into a selected predetermined position with great accuracy and in which the number of predetermined positions which may be selected is relatively great.

I employ for this purpose a series of individual selectors, each selector being independently operated from a suitable source of power, such as electrical, mechanical, hydraulic, etc. Each selector consists substantially of a controlling and controlled member, the controlled member being connected with a source of power, to be moved in one or the other direction and to be stopped when reaching a selected predetermined position on the controlling member. The controlled member is thereby caused to move through a predetermined distance (along a rectilinear, angular, or other path), this distance representing a fraction of a total desired distance for the load.

The controlled member of a selector is operatively connected with a controlling member of the next selector, the controlled member of which is independently operated from the source of power. The second controlled member is similarly caused to move through a predetermined angle (or over a path of other form), which is added to the amount of movement, transmitted to the controlling member from the first selector. Each succeeding selector, therefore, performs the sum of movements of the preceding selectors, the final selector moving the load through the total sum of the movements of the selectors.

Individual divisions of the selectors, or stopping points can be arranged on any desired scale, with equal divisions, or spaced according to any desired law.

With my integrating control apparatus it is possible to use a relatively small number of control points for a very large number of selectable predetermined positions. Thus the first selector may have units of relatively large dimensions (for instance, each unit corresponding to 45°, if angular scale is used); the second selector will have units within 45°, for instance, each of 5°; the next selector may have units within 5° such as of 1° value, and the last selector may have units of .1°

2 each. For the total of 3600 selectable points, therefore, only 36 points will be required.

Other advantages of my invention are more particularly explained in the accompanying specification and drawings in which—

Figure 1:
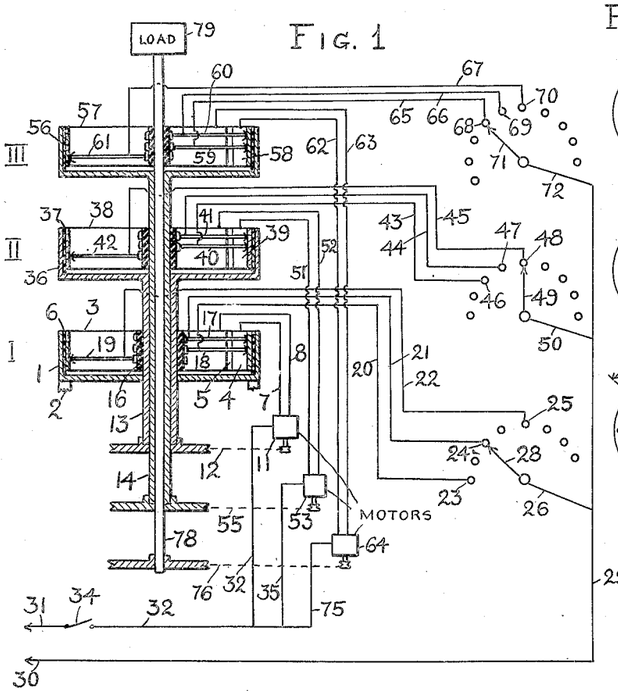
Fig. 1 is a diagrammatic view of one form of my control apparatus, employing selectors with electrical control elements.
Figure 2:
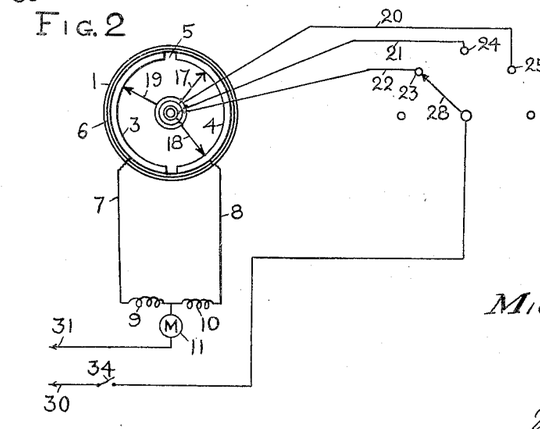
Fig. 2 is a diagram of connections for one of the selectors shown in Fig. 1.

My control apparatus in one of its forms as illustrated in Figs. 1 and 2 includes several selectors, generally indicated at I, II and III. Each selector comprises a control element, which remains stationary during the operation of such selector, and a controlled element which is moved to a selected predetermined position in relation to the control element. The control element of the first selector in this instance comprises a cylindrical body 1 rigidly supported at 2. Body 1 is provided inside with two semi-cylindrical conducting members 3, 4 made of metal or other conducting material, and separated by a gap 5. The semi-cylinders are mounted on an insulation layer 6 and are connected by leads 7, 8 with the ends of reversing windings 9, 10 (Fig. 2) of a reversible motor 11. The motor is connected by a suitable transmission 12 with a hollow shaft 13, mounted for rotation concentrically of the semi-cylindrical members 3, 4. An insulation sleeve 16 is mounted on the shaft 13, supporting a number of contact members 17, 18, 19, slidably engaging the segments or semi-cylinders 3, 4. The contact members are connected by leads 20, 21, 22 with contact points 23, 24, 25, etc. (Only three contact members are shown connected on each selector for clearness, but a greater number, as later explained, may be used in practice.) The contact points can be selectively engaged by a contact arm 28 which may be operated manually or by other means. It is connected by leads 26 and 29 with one terminal 30 of a source of current. The other terminal 31 is connected by a lead 32 with the motor 11. A manual switch 34 may be provided for disconnecting the current when not needed.

The other selectors are similarly constructed with the exception that each controlling member is mounted on a shaft, extending from a preceding controlled member, the latter setting up a starting point for the controlling member. Thus the second selector comprises a cylindrical body 36 rigidly mounted on the tubular shaft 13 and is lined inside with an insulation 37, supporting two semi-cylindrical members 38, 39, slidably engaged by contact members 40, 41, 42. The latter are connected by leads 43, 44, 45, etc. with contact points 46, 47, 48, etc., selectively engaged by a contact arm 49, connected by a lead 50 with the lead 29. The members 38, 39 are connected by leads 51, 52 with the reversing windings of a motor 53, the common lead of the winding being connected through the armature and through a lead 35 with the lead 32 and terminal 31 of the source of current. The motor is connected by a transmission 55 with a hollow shaft 14, supporting contact members 40, 41, 42.

The third selector also comprises a cylindrical body 56 with conducting semi-cylindrical members 57, 58 and contact members 59, 60, 61, with leads 62, 63 connecting the conducting members with the motor 64 and leads 65, 66, 67, connecting the contact members with contact points 68, 69, 70, and a movable contact arm 71, connected by a lead 72 with the lead 29. The motor is connected through a lead 75 with the lead 32 and terminal 31. It is also connected by a transmission 76, with an inner shaft 78, carrying contact members 59, 60, 61. This shaft is extended to the top of the device and operatively connected with a useful load 79.

The contact members of the respective selectors can be adjusted for any desired spacing, according to any desired rule or law. Usually, however, it is desired to adjust them for equal angular spacings, for rotating the load to any predetermined angular position. The selectors are arranged in stages, as described, in order to obtain a very large number of predetermined positions with relatively few controlling contact points.

Thus, for instance, the first selector may have eight contact members spaced at 45° apart. By moving the contact arm 28 to any desired point 23, 24, 25, etc. to the right or to the left, the shaft 13 may be caused to rotate through an angle of 45°, 90°, 135°, etc. Direction of rotation is determined by the position of the energized contact member on one or the other of the conducting members 3 or 4, which are connected with the reversing motor windings 9 and 10. The motor rotation is stopped when the gap 5 between the conducting members is occupied by the energized contact member, thereby de-energizing simultaneously both motor windings and thus stopping the motor by the opposing magnetic fields. It should be noted that the gap 5 is sufficiently wide to allow for the complete disconnection of the motor from the circuit. Other electrodynamic or similar means, depending on the type of motor may also be used to stop the motor.

The second selector is preferably arranged for smaller divisions, representing fractions of one division of the first selector. Thus, if the first selector has eight divisions of 45° each, the second selector may have nine divisions of 5° each. By placing the arm 49 on a corresponding contact point, the second motor 53 may be made to turn shaft 14 and with it the controlled member of the second selector through angles of 5°, 10°, 15°, etc. But since the starting point for the second selector has been advanced by 45°, 90°, or more, by the first controlled member, it follows that the second controlled member will advance thorugh an angle of $a+b$, where $a$ is the angle of advancement of the first controlled member, and $b$ is the angle of advancement of the second controlled member. Similarly the third controlled member which may have ten points 1° apart, will be made to advance through an angle $c$ equal to 1, 2, 3, etc. degrees.

A fourth selector may be added, with ten divisions of .1° if desired. The load 79 will be then rotated to an angle, representing the sum of the angles of rotation of individual selectors, with an accuracy of .1°.

It is easy to see that with relatively few contact points and connecting wires, it is possible to obtain a very large number of predetermined positions of the load. With four selectors, as mentioned above, the positions may be selected .1° apart, for a total of 3600 positions, with but 36 contact points to select the positions.

It will be understood that all of the selector switch arms as at 28, 49, 71 may be adjusted at one time or approximately at one time to contact with their respective selector switch points. In that event, motor 11 will proceed to properly adjust selector I. Meanwhile selectors II and III may also begin to operate unless the selector switch arms therein happen to be in positions to bridge gaps between conductor members as at 38—39 or 57—58. However, these movements of selectors II and III during the operation of selector I may have no significance toward the final result. However, after selector I has performed the desired adjustment of shaft 13, if selector II does not already happen to be at its desired selected stopping point, then selector II will continue its final operating movement for coming to rest at its desired stopping point. Then selector III will operate similarly while selectors I and II remain at their desired stopping points. In other embodiments of the invention disclosed, the selector switches for two or more stages may be similarly adjusted by the operator at one time or at about the same time and the several stages of selection will be performed or completed in succession, the desired operation of each succeeding selector following immediately the completion of the operation of the preceding selector.

Figure 3:
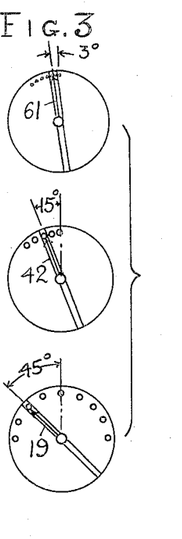
Fig. 3 is a diagrammatic view of positions of the control elements for one particular setting.

The arrangement of the contact points is shown diagrammatically in Fig. 3 in which the first selector is set for 45°, the second for 15°, and the third for 3°, the load being then moved through an angle of 63°.

Figures 5, 6:
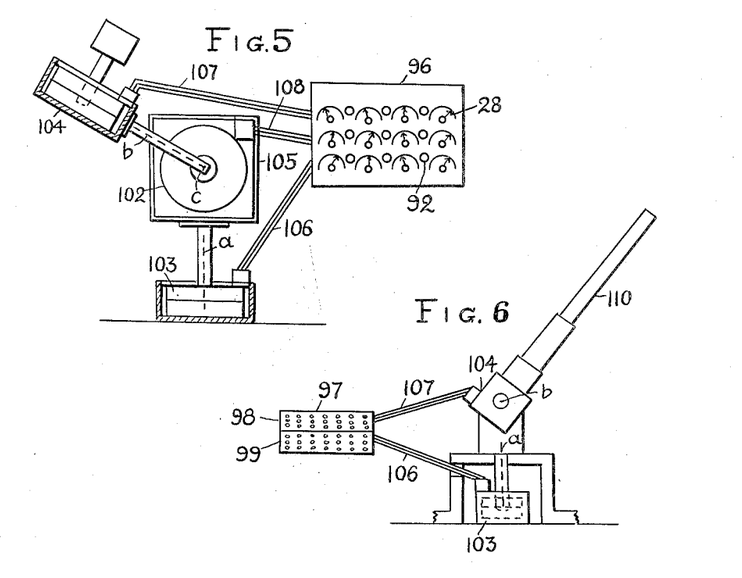
Fig. 5 is a diagrammatic view of an arrangement with three control apparatus mounted for operation in three different planes.
Fig. 6 is a similar view of an installation of the control apparatus for operating a gun.

Fig. 5 schematically illustrates an arrangement in which an object 102 is operatively connected with three control apparatus 103, 104, 105 for moving the object in three different planes, a common control board 96 being used for the operation, connected by leads of the required number as at 106, 107, 108 with the control devices.

That is, control apparatus 103 may be arranged to rotate the assembly upon which the object 102 is mounted, about an axis $a$; control apparatus 104 may rotate the mounting means for the object 102 about an axis $b$, whereas apparatus 105 causes rotation about an axis through the point $c$.

Figures 7, 10:
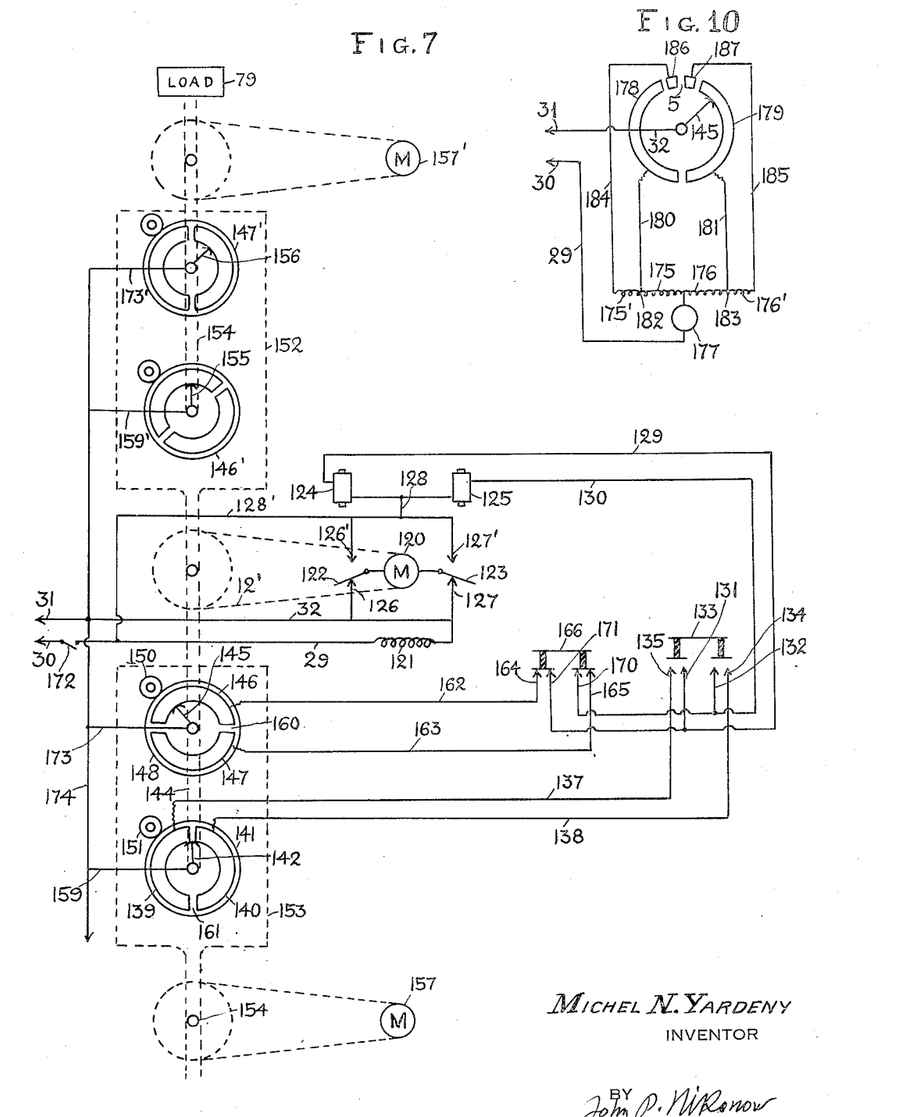
Fig. 7 is a diagrammatic view of a modified control system with individual control elements for each preselected position, showing also a relay arrangement for the control of the motors.
Fig. 10 is a diagrammatic view of a modified system for stopping motor hunting.

An arrangement for operating a gun 110 is shown schematically in Fig. 7, using two control apparatus 103 and 104 connected by leads 106, 107 with control board 97. The gun can thus be moved in two planes simultaneously. That is, control apparatus 103 may rotate the gun mounting about an axis $a$, whereas apparatus 104 causes rotation about an axis through the point $b$.

Figure 4:
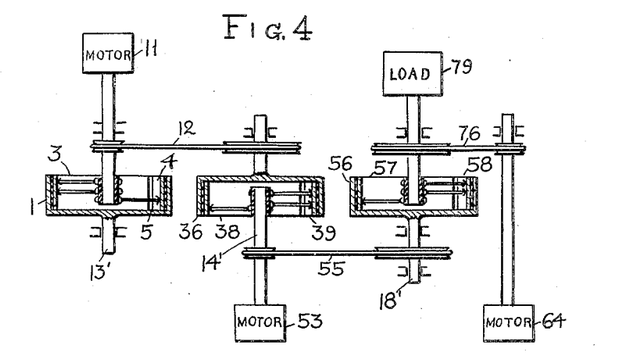
Fig. 4 is a diagrammatic view of a modified control apparatus with electric selectors.

A modified arrangement of the selectors is shown in Fig. 4. Instead of using concentric shafts as shown in Fig. 1, the selectors are mounted on parallel shafts 13', 14', 78', each shaft being operated by a separate motor. As to the other parts, the same reference numbers in Figs. 1 and 4 identify parts having corresponding functions.

Instead of the two intermediate motors 11, 53 and the load motor 64 shown in Fig. 1, the single load motor may be provided together with mechanical means such as solenoid operated clutches to take the place of the two intermediate motors. Such an arrangement is shown in Fig. 6 wherein load motor 64 drives a jack shaft $64^x$ on which are feathered for rotatable and axial movement three frictional discs 314, 315 and 316 associated with the respective selectors I, II and III. As clearly shown in Fig. 6, the edges of the frictional discs 314, 315 and 316 are beveled for frictional engagement with companion frictional discs 116, 117 and 118 which are associated with load shaft $79^x$ and intermediate shafts $79^{xx}$ and $79^{xxx}$ in a manner which will be subsequently described. Means such as tensile springs shown in Fig. 6, are provided to normally maintain the frictional discs 314, 315 and 316 out of the engagement with their companion discs 116, 117 and 118; in Fig. 6 frictional discs 315—118, 316—117 are shown in normal disengaged condition, whereas the third frictional discs 314—116 are shown in engaged condition. Electromagnetic means such as magnets $317^x$, $318^x$ and $319^x$ and their associated armatures 317, 318 and 319 are provided to engage the axially adjustable frictional discs 314, 315 and 316 with their companion frictional discs. Individual electromagnetic magnets are connected in individual circuits such as shown in Fig. 6 in connection with magnet $319^x$ to source of circuit supply 30, 31, individual leads $29^x$ and $32^x$; switches such as $34^x$, are provided which may be hand operated to close the circuit to the desired magnets.

Associated with the aforesaid shafts $79^x$, $79^{xx}$ and $79^{xxx}$ are the controlling elements and controlled members corresponding to those described in connection with the modification of Fig. 1, the counterpart of controlling element 1 of selector I, Fig. 1, is designated $113^x$ in Fig. 6 and is stationarily disposed relative to the shafts $79^x$, $79^{xx}$ and $79^{xxx}$. Cooperative with stationary controlling element $113^x$ are the rotatable contact arms (17, 18, 19, Fig. 1) diagrammatically represented by control member 113. The controlling element counter-part to 36 of selector II, Fig. 1, is designated $114^x$ in Fig. 6 and the cooperative control member is designated 114. Similar to the basic idea underlying the modification of Fig. 1, the controlled member 113 together with frictional disc 116, of the first selector I are rotatable as a unit together with the controlling element $114^x$ of selector II. Similarly the control member 114 and frictional disc 117 of selector II are rotatable as a unit together with controlling element $115^x$ of selector III. The control member 115 and frictional disc 118 of selector II are individually rotatable with load 79. To place any one of the selectors I, II, III into operation, the switch such as $34^x$ is crossed to energize the respective electromagnetic magnet $317^x$, Fig. 6, to cause attraction of its armature 317 to move its feathered frictional disc 314 into frictional engagement with the associated frictional disc 116; rotation of the motor is thus made effective to rotate the parts 116, 113, $114^x$ associated as already explained with selectors I and II in the manner similar to that more fully explained in connection of the modification of Fig. 1.

Various types of motors may be used with my system and by way of an example, a shunt motor 120 is shown in Fig. 7, with a shunt field 121, permanently connected with the terminals 30, 31, by leads 29, 32. Terminals of the armature of the motor are connected with contact arms 122, 123 of relays 124, 125. The arms are normally held against contact points 126, 127, short circuiting the armature and thereby preventing the armature from rotation by positive dynamic braking. The relays are connected at one side by leads 128 and 128' with the lead 29, the other ends of the relay coils being connected by leads 129, 130 with contact points 131, 132 of a double switch 133, alongside the contact points 134, 135, connected by leads 137, 138 with conducting segments 139, 140, mounted on an insulation disc 141.

The segments 139, 140 are engaged by a contact arm 142 on shaft 144, which also carries a contact arm 145 of a second selector unit, comprising segments 146, 147 on an insulation disc 148. Discs 148, 141 are rotatably supported in a casing 153 on top of a shaft 154 connected with a motor 157. The upper casing 152 supports discs 146', 147' on a shaft 154 connected with a load 79 and a motor 157'. The shaft 144 is operated by the motor 120 through transmission 12'.

Relative positions of the discs 141, 148, and others, can be individually adjusted with reference to their gaps 160, 161 by manually operable pinions, preferably frictional, 150, 151. The spacing of the gaps, i. e. their angular positions, may be uniform, or it may follow any desired law, progressively increasing or decreasing.

The segments 146, 147 are connected by leads 162, 163 with contact points 164, 165 of a switch 166 for connecting the segments with the relay coils 124, 125 by leads 170, 130, 171, 129. The arms 142, 145, 155, 156 are connected by leads 159, 173, 159', 173' and a common lead 174 with terminal 31.

When one of the switches is closed, as the switch 166, the corresponding segments 146, 147 are connected with the relay coils 124, 125, one of which is energized, depending on the position of the contact member 145 on one or the other of the conducting segments, the circuit being completed through the leads 128, 128' to the terminal 30. The relay arm 122 or 123 will be attracted by the energized relay coil, closing the circuit for the motor armature in one or the other direction. Direction of rotation of the motor will be determined by the position of the contact arm 145 on one or the other of the segments 146, 147. Both relay arms 122, 123 will be attracted when the contact arm 145 bridges the gap 160, thereby energizing simultaneously both relay coils. The armature will then be short circuited with both its terminals connected to lead 29, being instantly stopped by dynamic braking.

While in Fig. 7, each of the selectors 152, 153 is shown as having only two of the rotatable disc assemblies, it will be understood that in practice a greater number of such assemblies would be used, for example nine, in the case of selector 153, if this selector is to be used for purposes corresponding to that of selector II of Fig. 1. In that case a corresponding number of the switches as at 133, 166 would also of course be provided. In effect it will be noted that these switches correspond in number and in general function to switch contacts such as 23, 24, 25 of Fig. 1.

It will be apparent in Fig. 7 that motors 157 and 157' respectively may be controlled by circuits the same as for motor 120. In operating, motors, 157, 120 and 157' respectively in effect perform functions corresponding to those of motors 11, 53 and 64 in Fig. 1.

Fig. 10 shows a circuit arrangement operating substantially in accordance with the principles of that of Fig. 2, but with supplemental means for changing the speed of the motor as the contact arm approaches the gap 5. The field windings 175, 176 of a motor 177 are connected to main segments 178, 179 by leads 180, 181 from taps 182, 183, additional windings 175', 176' being connected by leads 184, 185 with short supplementary segments 186, 187 at the main gap 5. It will be apparent with this arrangement, as the contact arm approaches the gap in either direction, due to connection into the circuit of one of the auxiliary field windings, the speed of the motor will be altered. It will be understood that by the use of the supplemental contacts as at 186, 187, the various motor windings may be so designed and connected as to either increase or decrease the motor speed as the contact arm approaches the gap 5. If the design is such as to decrease the speed at this time, then hunting will tend to be prevented.

Figure 8:
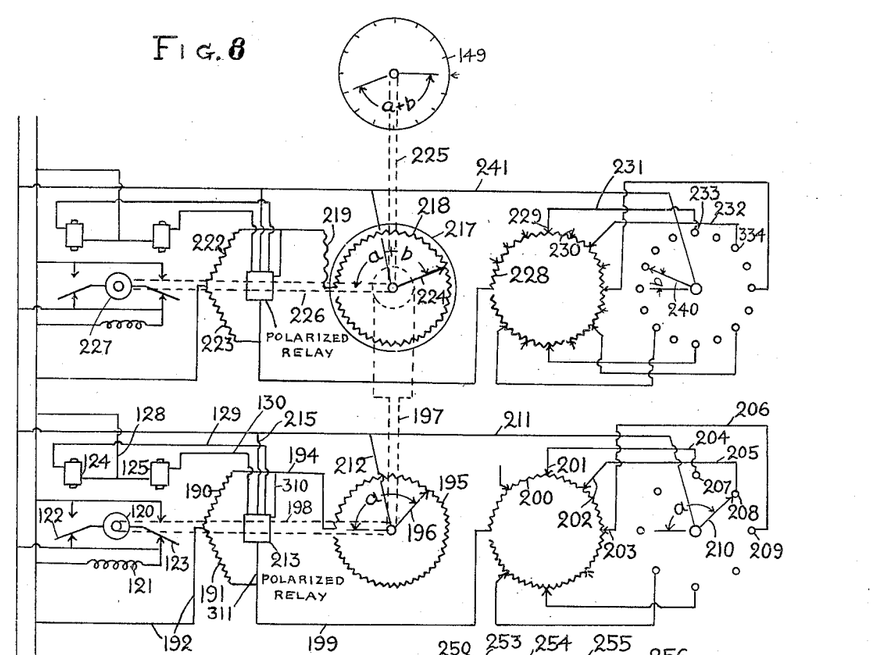
Fig. 8 is a diagrammatic view of a control system in which individual selectors are constructed on the principle of the Wheatstone bridge.
Figure 8A:
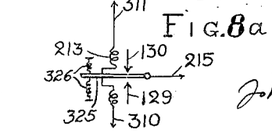
Fig. 8a shows certain details of this system.

Another modification is shown in Fig. 8, the selectors being made in the form of Wheatstone bridges. Two such selectors are shown by way of an example. The first selector comprises two resistors, 190, 191 connected by lead 192 to the terminal 31 of a source of current. The free end of the resistor 190 is connected by a lead 194 to a variable resistor 195 over which can be moved contact arm 196 mounted on a shaft 197 and connected by a transmission 198 to the motor 120. The free end of the resistor 191 is connected by a lead 199 to a second variable resistor 200. The latter is provided with several contact points 201, 202, 203, etc., connected by leads 204, 205, 206 to individual contact points 207, 208, 209, etc. These points can be selectively energized by contact arm 210 connected by lead 211 to the terminal 30, the arm 196 being also connected to lead 211 by lead 212. The ends of the resistors 190, 191 are connected to a polarized relay 213, the connections within which are shown in further detail in Fig. 8a.

The relay is connected at one side to the terminal 30 by leads 215 and 211 and can alternately energize motor relays 124, 125 through leads 129 or 130. As soon as the arm 210 is placed against one of the points 207, 208 or 209, current will begin to flow through the relay 213, the direction of the current depending on the position of the arm 196 with reference to the corresponding energized point of the resistor 200.

A relay arm 225 is movably placed between the coils of the relay 213 connected by leads 310, 311 with the ends of the resistors 191, 190. The arm 325 is retained in the neutral position by springs 326 and connected by leads 215, 211 with the terminal 30. The magnet may be attracted by one of the relay coils, depending on the direction of the current, for engaging one of the leads 129 or 130, thereby energizing one of the relays 124, 125. Accordingly, one of the relays 124 or 125 will be energized, attracting the corresponding contact arms 122 or 123 and causing the motor 120 to rotate in a corresponding direction. The rotation will continue until the arm 196 reaches a position corresponding to the energized point on the resistor 200 when the arm 325 of the relay 213 will move to neutral position and both relays 124 and 125 will be deenergized. The arms 122 and 123 will then short circuit the armature of the motor 120 causing the motor to stop by dynamic braking.

The shaft 197 is connected to a disc 217 supporting a resistor 218 of the next selector unit. This resistor is connected by a flexible lead 219 to one end of a resistor 222 forming together with a second resistor 223 a part of the second Wheatstone bridge. The resistor 218 is engaged by contact arm 224 mounted on a shaft 225 connected with a disc 149 indicating an angular position of the shaft 225 and of a load which may be connected thereto. This shaft is also connected by suitable transmission 228 to a second motor 227. A second variable resistor 228 is connected at its different points 229, 230, etc. by leads 231, 232, etc. to individual contact points 233, 234, etc. which may be selectively energized by contact arm 240 connected by lead 241 to the terminal 30. The operation of this device is similar to the operation of the devices of Figs. 1 and 7 in that the total angle a+b of movement of the load consists of the sum of the individual angles of movement of the first and second selectors. Thus if the first selector is moved through an angle a, a disc 217 with its resistor 218 of the second selector will be moved through the same angle a, thereby correspondingly advancing the starting point for the arm 224.

The latter arm is then moved by the second motor 227 through an angle b, thereby rotating the shaft 225 through the sum of the two angles.

Figure 9:
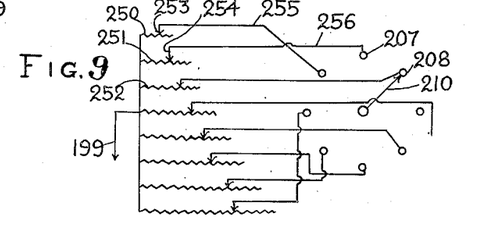
Fig. 9 is a fractional diagrammatic view of a modification of the system shown in Fig. 8.

A modified variable resistor arrangement is shown in Fig. 9. The resistor in this case comprises separate resistor units 250, 251, 252, etc. with adjustable or sliding contact points 253, 254, etc. connected by leads 255, 256, etc., with the contact points 207, 208, etc. to be energized by the arm 210. Such an arrangement may be used when steps between the successive points shall be made very small.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. An electric tele-control apparatus comprising a plurality of selectors including a first and a second selector, each selector having a controlling and a controlled element displaceable relative to each other, each of said controlling elements having a plurality of predetermined stopping positions relative to the associated controlled element; separate driving means for each of said selectors, respectively; an energizing circuit for each of said driving means, said circuit including the controlling and the controlled element of the respective selector, said controlled element being mechanically coupled to said respective driving means for displacement thereby relative to the associated controlling element when said respective driving means is activated by way of said circuit; a load mechanically coupled to the controlled element of said second selector for entrainment thereby; a mechanical coupling interconnecting the controlling element of said second selector with the controlled element of said first selector for entrainment of the former by the latter; and separate actuating means for each selector, respectively, said actuating means being selectively operable to be rendered effective to de-activate the respective driving means by the controlled and controlling elements of the associated selector occupying a selected stopping position.

2. An electric tele-control apparatus comprising a plurality of selectors connected in cascade, each selector having a controlling and a controlled element displaceable relative to each other, each of said controlling elements having a plurality of predetermined stopping positions relative to the associated controlled element; mounting means fixedly holding the controlling element of the first selector in place; mechanical coupling means positively connecting the controlled element of each selector except the last with the controlling element of a respective selector immediately succeeding for entrainment of such controlling element by such controlled element; a load mechanically coupled to the controlled element of the last selector for entrainment thereby; separate driving means for each of said selectors, respectively, each of said driving means being mechanically coupled to the controlled element of the respective selector for displacement of said controlled element relative to the associated controlling element; an energizing circuit for each of said driving means, said circuit including the controlling and the controlled element of the respective selector; and separate actuating means for each selector, respectively, said actuating means being selectively operable to de-energize the respective driving means by the controlled and controlling elements of the associated selector occupying a selected stopping position, whereby, upon operation of each of said actuating means to select a respective stopping position of each of said selectors, said load will undergo a displacement with respect to said mounting means which will equal the sum of the displacements of all of said controlled elements relative to their respectively associated controlling elements.

3. An electric tele-control apparatus comprising a plurality of selectors including a first and a second selector, each selector having substantially circular conductor means and rotatable wiper means engageable with said conductor means, each of said wiper means having a plurality of predetermined stopping positions relative to the associated conductor means; a motor for each of said selectors, respectively, each of said motors being mechanically coupled to said wiper means of the respective selector for rotation of said wiper means relative to the associated conductor means; an energizing circuit for each of said motors, said circuit including the said wiper means and conductor means of the respective selector; a rotatable load mechanically coupled to the wiper means of said second selector for entrainment thereby; a rotatable member positively connecting the conductor means of said second selector with the wiper means of said first selector for entrainment of the former by the latter; and separate actuating means for each selector, respectively, said actuating means being selectively operable to be rendered effective to de-energize the respective motor by the wiper means and conductor means of the associated selector occupying a selected stopping position.

4. An electric tele-control apparatus comprising a plurality of selectors including a first and a second selector, each selector having controlling conductor means and controlled conductor means engageable with said controlling conductor means; separate driving means for each of said selectors, respectively, each of said driving means being mechanically coupled to said controlled conductor means of the respective selector for displacement of said controlled conductor means relative to the associated controlling conductor means; an energizing circuit for each of said driving means; separate actuating means for each selector adapted to connect a part of said controlled conductor means of the selector and a portion of said controlling conductor means of the selector in the said energizing for the respective driving means whereby said driving means will remain operated until said part moves off the said portion; mechanical coupling means interconnecting the controlled conductor means of said first selector with the controlling conductor means of said second selector for simultaneous displacement; and a load mechanically coupled to the controlled conductor means of said second selector for entrainment by the latter.

5. An electric tele-control apparatus comprising a plurality of selectors connected in cascade, each selector having controlling conductor means and controlled conductor means engageable with said controlling conductor means; mounting means fixedly holding said controlling conductor means of the first selector in place; mechanical coupling means positively connecting said controlled conductor means of each selector except the last with said controlling conductor means of a respective selector immediately succeeding for entrainment of such controlling conductor means by such controlled conductor means; a load mechanically coupled to said controlled conductor means of the last selector for entrainment thereby; separate driving means for each of said selectors, respectively, each of said driving means being mechanically coupled to said controlled conductor means of the respective selector for displacement of said controlled conductor means relative to the associated controlling conductor means; an energizing circuit for each of said driving means; and separate actuating means for each selector adapted to connect a part of said controlled conductor means of the selector and a portion of said controlling conductor means of the selector in the said energizing circuit for the respective driving means whereby said driving means will remain operated until said part moves off the said portion.

6. An electric tele-control apparatus comprising a plurality of selectors including a first and a second selector, each selector having substantially circular conductor means and rotatable wiper means engageable with said conductor means;

a motor for each of said selectors, respectively, each of said motors being mechanically coupled to said wiper means of the respective selector for rotation of said wiper means relative to the associated conductor means; an energizing circuit for each of said motors; separate actuating means for each selector adapted to connect a part of said wiper means of the selector and a portion of said conductor means of the selector in the said energizing circuit for the respective motor whereby said motor will remain operated until said part moves off the said portion; a rotatable load mechanically coupled to the wiper means of said second selector for entrainment thereby; and a rotatable member positively connecting the conductor means of said second selector with the wiper means of said first selector for simultaneous rotation.

7. An electric tele-control apparatus comprising a plurality of selectors including a first and a second selector, each selector having a plurality of wipers mechanically interconnected for synchronous movement and further having conductor means displaceable relative to said wipers, each of said wipers being engageable with at least a portion of said conductor means, said portion having a discontinuity; separate driving means for each of said selectors, respectively, each of said driving means being mechanically coupled to the wipers of the respective selector for displacement of said wipers relative to the associated conductor means; an energizing circuit for each of said driving means; separate actuating means for each selector operable to connect a selected wiper thereof and a portion of the associated conductor means engaged by the selected wiper in the said energizing circuit for the respective driving means whereby said driving means will remain operated until the selected wiper registers with the said discontinuity; mechanical coupling means interconnecting the wipers of said first selector with the conductor means of said second selector for simultaneous displacement; and a load mechanically coupled to the wipers of said second selector for entrainment by the last-mentioned wipers.

8. An electric tele-control apparatus comprising a plurality of selectors connected in cascade, each selector having a plurality of wipers mechanically interconnected for synchronous movement and further having conductor means displaceable relative to said wipers, each of said wipers being engageable with at least a portion of said conductor means, said portion having a discontinuity; mounting means fixedly holding said conductor means of the first selector in place; mechanical coupling means positively connecting the wipers of each selector except the last with said conductor means of a respective selector immediately succeeding for entrainment of such conductor means by such wipers; a load mechanically coupled to the wipers of the last selector for entrainment thereby; separate driving means for each of said selectors, respectively, each of said driving means being mechanically coupled to the wipers of the respective selector for displacement of said wipers relative to the associated conductor means; an energizing circuit for each of said driving means; and separate actuating means for each selector operable to connect a selected wiper thereof and a portion of the associated conductor means engaged by the selected wiper in the said energizing circuit for the respective driving means whereby said driving means will remain operated until the selected wiper registers with the said discontinuity.

9. An electric tele-control apparatus comprising a plurality of selectors including a first and a second selector, each selector having substantially circular conductor means and a plurality of rotatable wipers each engageable with at least a portion of said conductor means, said portion having a discontinuity; a motor for each of said selectors, respectively, each of said motors being mechanically coupled to the wipers of the respective selector for rotation of said wipers relative to the associated conductor means; an energizing circuit for each of said motors; separate actuating means for each selector operable to connect a selected wiper thereof and a portion of the associated conductor means in the said energizing circuit for the respective motor whereby said motor will remain operated until the selected wiper registers with the said discontinuity; a rotatable load mechanically coupled to the wipers of said second selector for entrainment thereby; and a rotatable member positively connecting the conductor means of said second selector with the wipers of said first selector for simultaneous rotation.

10. An electric tele-control apparatus comprising a plurality of selectors including a first and a second selector, each selector having a plurality of conductor members each provided with a discontinuity and further having a plurality of wipers each engageable with a respective one of said members, mounting means maintaining all of said members of a selector in fixed relative position, and coupling means mechanically interconnecting all of said wipers of a selector for synchronous movement relative to said conductor members, said wipers being staggered with respect to the said discontinuities of the conductor members respectively engageable thereby; separate driving means for each of said selectors, respectively, each of said driving means being mechanically connected with the said coupling means of the respective selector for displacement of said wipers relative to the associated conductor members; a source of power; switch means selectively operable to connect any of said driving means to said source by way of a selected wiper and associated conductor member of the respective selector, whereby said driving means will be operated until said selected wiper registers with the discontinuity of said associated conductor member; and a load mechanically connected with said coupling means of said second selector for displacement in synchronism with the wipers of said second selector, said mounting means of said second selector being mechanically connected with said coupling means of said first selector for displacement in synchronism with the wipers of said first selector.

11. An apparatus according to claim 10, wherein each of said driving means comprises a reversible motor, each of said conductor members comprising a pair of substantially semicircular conductor elements separated by gaps, said switch means being adapted to close a first circuit, for energizing said motor in one sense, by way of one conductor element and to close a second circuit, for energizing said motor in the opposite sense, by way of the other conductor element of each pair of the selector associated with said motor.

12. An apparatus according to claim 11, further comprising a first relay energizable by said switch means over one of the conductor elements of a selected pair of a selector to complete said first circuit for the respective motor, and a second relay energizable by said switch means over the other of the conductor elements of a selected pair of said selector to complete said second circuit for the respective motor, all of said wipers being adapted to bridge the said gaps separating the conductor elements of the respective pairs whereby both of said relays will be simultaneously actuated, neutralizing each other.

13. An apparatus according to claim 12, wherein said motor is of the shunt type and has an armature forming part of both said first and said second circuit, said relays having contacts arranged to short-circuit said armature when both of said relays are either operated or unoperated, whereby a braking action will be exerted upon said motor.

14. An electric tele-control apparatus comprising a plurality of selectors including a first and a second selector, each selector having a conductor member provided with a discontinuity and further having a plurality of wipers each engageable with said member and staggered with respect to said discontinuity; first mounting means insulatingly connecting the wipers of said first selector and the conductor member of said second selector together for synchronous rotation relative to the conductor member of said first selector; a load; second mounting means insulatingly connecting the wipers of said second selector together and to the said load for synchronous rotation relative to the conductor member of said second selector; separate driving means for each of said selectors, respectively, each of said driving means being mechanically connected with the said mounting means of the respective selector for displacement of the wipers thereof relative to the associated conductor member; a source of power; and switch means selectively operable to connect any of said driving means to said source by way of a selected wiper and said conductor member of the respective selector, whereby said driving means will be operated until said selected wiper registers with said discontinuity.

15. An electric tele-control apparatus comprising a plurality of selectors including a first and a second selector, each selector having a potentiometer and a wiper engageable with said potentiometer; first mounting means connecting the wiper of said first selector with the potentiometer of said second selector for synchronous displacement relative to the potentiometer of said first selector; a load; second mounting means connecting the wiper of said second selector with said load for synchronous displacement relative to the potentiometer of said second selector; separate driving means for each of said selectors, respectively, each of said driving means being mechanically connected with the said mounting means of the respective selector for displacement of the wiper thereof relative to the associated potentiometer; a first and a second bridge circuit each including a respective one of said potentiometers and wipers; a source of power connected across one diagonal of each bridge; polarized relay means connected across the other diagonal of each of said bridge circuits, respectively, said relay means being adapted to operate the respective driving means in one of two directions so as to tend to displace the associated wiper in a sense to balance the bridge; and switch means selectively operable to unbalance each of said bridges whereby the associated wiper will be displaced.

MICHEL N. YARDENY.

REFERENCES CITED

The following references are of record in the file of this patent:

UNITED STATES PATENTS

| Number | Name | Date |
| --- | --- | --- |
| 1,123,067 | Barkhausen et al. | Dec. 29, 1914 |
| 1,268,712 | Harle | June 4, 1918 |
| 1,706,968 | Schleicher et al. | Mar. 26, 1929 |
| 1,768,966 | Tanner | July 1, 1930 |
| 1,788,670 | Granat | Jan. 13, 1931 |
| 1,985,982 | Edwards | Jan. 1, 1935 |
| 2,108,607 | Nelson | Feb. 15, 1938 |
| 2,342,717 | Yardeny | Feb. 29, 1944 |

FOREIGN PATENTS

| Number | Country | Date |
| --- | --- | --- |
| 449,886 | Germany | Sept. 28, 1927 |